Patented Nov. 16, 1926.

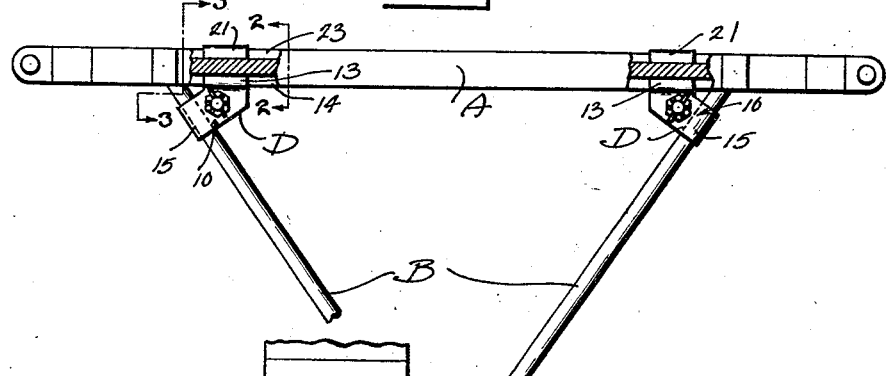
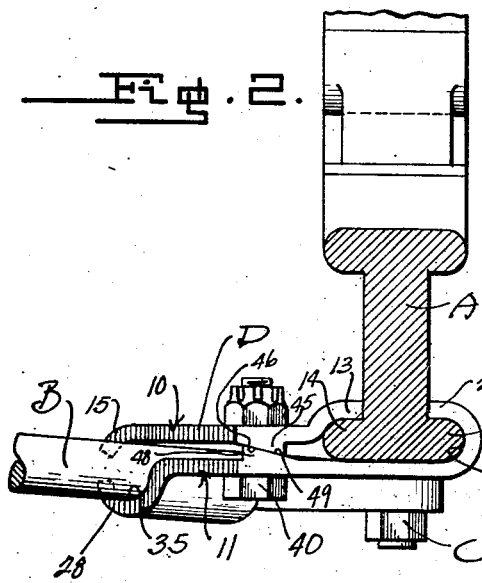
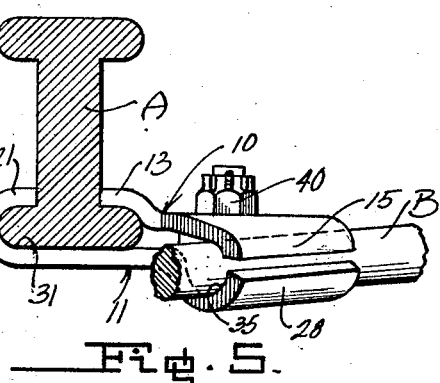
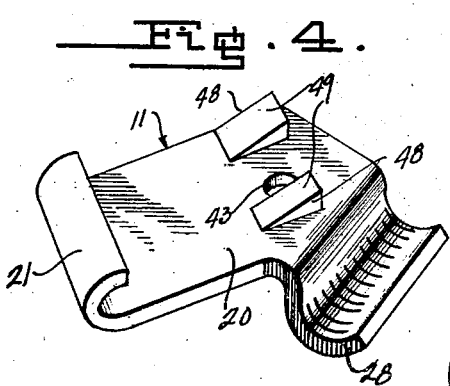

1,606,848

UNITED STATES PATENT OFFICE.

OSCAR W. SNELLMAN, OF DEER CREEK, MINNESOTA.

RADIUS-ROD SUPPORT.

Application filed April 14, 1924. Serial No. 706,519.

This invention relates to improvements in means for connecting radius rods to supports.

The primary object of this invention is the provision of means for connecting radius rods to axles, the same being particularly desirable as used in connection with the front radius rods of "Ford" vehicles, in order to adequately reinforce the radius rod at its connection with the axle, and as a safety measure in protecting life and property incident to a more stable connection of the radius rods with the vehicle parts.

A further object of this invention is the provision of a novel type of sectional clamp embodying bolt means, and means whereby the sections of the clamp may be moved into a more effective clamping relation both with an axle and with a radius rod upon tightening of the bolt.

Other objects and advantages of this invention will be apparent during the course of the following detailed description.

In the accompanying drawing, forming a part of this specification, and wherein similar reference characters designate corresponding parts throughout the several views.

Figure 1 is a plan view, partly in section, showing an axle and radius rod connections therewith, such as is ordinarily used upon Ford motor vehicles, and in addition showing the improved auxiliary or safety radius rod connecting means.

Fig. 2 is a fragmentary cross sectional view taken through an axle, showing the improved safety clamp as used for connecting a radius rod to an axle, this view being taken substantially on the line 2—2 of Figure 1.

Fig. 3 is a cross sectional view taken substantially on the line 3—3 of Figure 1.

Figs. 4 and 5 are perspective views showing the sections of the improved radius rod clamp.

In the drawing, wherein for the purpose of illustration is shown a preferred embodiment of this invention the letter A may generally designate a front axle, or other vehicle support, with which the radius rods B are connected. As is the case with Ford cars, the radius rod B at their forward ends have conventional connecting means C by which they are connected to the axle A. This connecting means C is not as efficient as it should be, and the instances are common where fracture of the connection of the radius rod B occurs at the connection C, resulting in destruction of parts of the vehicle, and endangering the lives of the occupants of the vehicle. To obviate these undesirable results an improved clamp or connecting device D is provided which is used either for solely supporting the radius rod B upon the axle A, or which may be used as an auxiliary connecting means for reinforcing the connection of the radius rods B with respect to the axle A, this connection means D being so positioned that it will not interfere with the ordinary connecting means C.

Referring to the improved clamp D, each of the same includes upper and lower clamp sections 10 and 11, which are preferably stamped of sheet metal. The upper section 10 includes the main body portion 12, which at its forward end is upwardly and forwardly arcuated, to provide the axle engaging flange 13, which is adapted to rest upon the top surface of the lower inside flange 14 of the axle A. At its opposite end the section 10 is provided with the downwardly arcuate radius rod engaging flange or portion 15, which is adapted to fit over the top of the radius rod B just rearwardly of its connection C with the axle A.

The lowermost section 11 of the improved clamp device D consists of a main body portion 20, which is preferably of plane formation, and which at its forward end is provided with the upwardly arcuate flange 21, which is adapted to engage over the forward lowermost flange 23 of the axle A, at the opposite side of the axle A from that which the flange 13 of the section 10 engages. It is of course understood that the body 20 of the section 11 extends beneath the axle A in abutting relation therewith, and at its rear end the section 11 is preferably provided with the downwardly concavo-convex flange or socket 28, which receives the radius rod B therein.

When the clamp parts 10 and 11 are connected together, it is to be noted that the flange portions 13 and 21 thereof provide a passageway 31 for reception of the lower portion of the axle A, as is illustrated in Figure 1 of the drawings. In similar manner the flanges 15 and 28 of the sections 10 and 11 respectively, at their rear ends provide a passageway 35 for receiving the radius rod B therethrough. The passageways 31 and 35 are formed at acute angles with respect to each other, in order to accommodate the axle and the radius rod parts as is illustrated in the drawings.

A novel feature of this invention is the fact that the clamp sections 10 and 11 may be made to move the more effectively to engage the axle and radius rod parts when these sections are drawn together upon tightening of the bolt means 40. The bolt means 40 extends through openings 42 and 43 formed in the main bodies 12 and 20 of the clamp sections 10 and 11, and at opposite sides of the opening 42 lugs 45 are provided, with inclined surfaces 46 which incline in a downwardly sloping relation toward the front end of the section 10. In similar manner lugs 48 are formed upon the clamp section 11, at opposite sides of the opening 43 therein, which are provided with sloping surfaces 49 inclining in downwardly sloping relation toward the forward end of the clamp section 11.

When the sections 10 and 11 are in facing relation, the surfaces 46 engage the surfaces 49 of the lugs or parts 45 and 48, so that upon tightening of the bolt means 40 to move the clamp parts 10 and 11 together, the clamp sections 10 and 11 are slid longitudinally of each other in opposite directions to more firmly clamp the retaining flanges 13 and 21 of the parts 10 and 11 against the axle flanges 14 and 23. In similar manner this relative longitudinal movement of the axle parts 10 and 11 also clamp the radius rod flanges 15 and 28 into a more firm gripping engagement with the radius rod. If desired, the radius rod clamping flanges 15 and 18 upon their concave surfaces may be serrated for the more firmly gripping of the radius rod B, to prevent relative movement of the same when it is clamped in the passageway 35.

From the foregoing description of this invention it is apparent that a novel arrangement for the reinforced and auxiliary clamping of radius rods to axles has been provided, which includes certain novel features, which will be apparent to those skilled in the art to which this invention relates.

While this clamp has been shown used to connect a radius rod with a vehicle axle, it is obvious that the clamp could be used for connecting other articles and therefore the right reserved to use the clamp wherever it can be conveniently used.

Various changes in the shape, size, and arrangement of parts may be made to the form of the invention herein shown and described, without departing from the spirit of this invention or the scope of the claims.

I claim:

1. A clamp of the character described comprising a pair of sections each having a jaw portion adapted for engaging an article, and a second jaw portion adapted for engaging another article, means for clamping the sections together, and other means on the sections for causing relative movement of the sections in a direction transverse to the clamping action of the first means as the clamp means is tightened and causing the jaw portions to be moved into a gripping position.

2. A clamp of the character described comprising a pair of sections each having a jaw portion at one end adapted for engaging an article and at its other end a jaw portion for engaging another article, means for drawing said sections towards each other, and means for causing movement of the sections longitudinally in opposite directions upon tightening of the means for drawing the sections together, whereby the sections will be moved longitudinally of each other and cause the jaw portions to tightly grip articles disposed between them.

3. A clamp adapted for securing a radius rod to an axle and comprising a pair of sections each having a jaw portion adapted for engaging a radius rod and a jaw portion adapted for engaging an axle, bolt means passing through the sections for drawing the sections towards each other, and cam means on the facing sides of said sections having sloping faces sloping in the same direction transversely of the axis of the bolt and acting against each other when the bolt means is tightened to cause the clamp sections to slide laterally of the bolt means in opposite directions and cause the jaw portions to be moved into a gripping position.

4. A clamp adapted for securing a radius rod to an axle and comprising sections each having portions extending at an acute angle to each other and at their outer ends terminating in gripping flanges, bolt means passing through said sections at a point intermediate the end flanges for drawing the sections towards each other, and cam means for causing the sections to move longitudinally of each other in opposite directions when the bolt is tightened and cause the gripping flanges to move into a gripping position.

5. As an article of manufacture, a clamp comprising a section having a retaining flange formed on each end thereof, a second section having a retaining flange formed on each end thereof, bolt means for connecting the sections together at a point between the retaining flanges of said sections, said sections on the facing sides thereof having abutting inclined cam forming surfaces which are disposed at a slope in acute angular relation with respect to the axis of the bolt means whereby upon tightening of the bolt means the sections will be moved longitudinally in opposite directions and the retaining flanges moved into gripping engagement with articles disposed between the flanges of the sections.

6. In a clamp a pair of sections each having a jaw portion for engaging an article, means to clamp the sections together causing movement of the jaw portions directly towards each other, and other means cooperating with the first mentioned clamping means for causing relative movement of the sections in a direction transverse to the clamping action of the first means as said first means is tightened.

OSCAR W. SNELLMAN.